United States Patent
Kuboyama

(10) Patent No.: US 10,749,346 B2
(45) Date of Patent: Aug. 18, 2020

(54) POWER MANAGEMENT SYSTEM

(71) Applicant: Mitsubishi Electric Corporation, Tokyo (JP)

(72) Inventor: Yutaka Kuboyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 124 days.

(21) Appl. No.: 16/078,468

(22) PCT Filed: Apr. 14, 2016

(86) PCT No.: PCT/JP2016/062045
§ 371 (c)(1),
(2) Date: Aug. 21, 2018

(87) PCT Pub. No.: WO2017/179178
PCT Pub. Date: Oct. 19, 2017

(65) Prior Publication Data
US 2019/0052085 A1    Feb. 14, 2019

(51) Int. Cl.
*H02J 3/32* (2006.01)
*H02J 7/35* (2006.01)
*H02J 3/38* (2006.01)
*H02J 7/00* (2006.01)

(52) U.S. Cl.
CPC .......... *H02J 3/32* (2013.01); *H02J 3/38* (2013.01); *H02J 3/383* (2013.01); *H02J 7/007* (2013.01); *H02J 7/35* (2013.01)

(58) Field of Classification Search
CPC ...... H02J 3/32; H02J 3/38; H02J 3/383; H02J 7/007; H02J 7/35
See application file for complete search history.

(56) References Cited

U.S. PATENT DOCUMENTS 9,509,149 B2    11/2016    Kusunose

FOREIGN PATENT DOCUMENTS

| JP | 6-133472 A | 5/1994 |
| JP | 2008-154334 A | 7/2008 |
| JP | 2010-11705 A | 1/2010 |
| JP | 2013-31266 A | 2/2013 |

(Continued)

OTHER PUBLICATIONS

Notification of Reasons for Refusal issued in Japanese Patent Application No. 2016-200653, dated Feb. 22, 2017.

(Continued)

*Primary Examiner* — Robert L Deberadinis
(74) *Attorney, Agent, or Firm* — Birch, Stewart, Kolasch & Birch, LLP.

(57) ABSTRACT

A power management system for supplying generated power from a solar cell, which is the power generator, to a power grid and a storage battery, which is the power storage device, includes a controller that controls charging power supplied to the storage battery and output power from the solar cell in order for the generated power not to flow backward to the power grid; a voltage monitoring unit that monitors the voltage of the power grid; and a current monitoring unit that monitors the current from the power grid. The controller controls the charging power sent to the storage battery in accordance with power purchased from the power grid on the basis of the voltage and the current; and the storage battery and the solar cell are controlled in accordance with different thresholds of purchased power.

9 Claims, 6 Drawing Sheets

(56) References Cited

FOREIGN PATENT DOCUMENTS

| JP | 2014-27761 A | 2/2014 |
| JP | 2014-45527 A | 3/2014 |
| JP | 2014-110649 A | 6/2014 |
| JP | 2014-168328 A | 9/2014 |
| WO | WO 2013/015256 A1 | 1/2013 |

OTHER PUBLICATIONS

Notification of Reasons for Refusal issued in Japanese Patent Application No. 2016-200653, dated May 29, 2017.

POWER MANAGEMENT SYSTEM

FIELD

The present invention relates to a power management system connected to a power generator and a power storage device.

BACKGROUND

Power generators that use renewable energy, typically solar power, and systems that store inexpensive late-night power in a power storage device for the electrical energy stored therein to be consumed as a residential load during the day are becoming more common of late.

However, when output power from the power generator flows backward to the power grid, the voltage of the power grid is increased. It is thus required to prevent this increase in the voltage of the power grid by decreasing the output power from the power generator and thus decreasing the power flowing backward to the power grid when the voltage of the power grid exceeds a threshold or when a power company demands prevention of reverse power flow to their power grid.

In the case where the power generator uses renewable energy to generate electricity, a decrease in the output power from the power generator lowers the usage efficiency of the renewable energy.

Patent Literature 1 describes a conventional technology wherein, in a power management system that is connected to a power grid and includes a power generator and a power storage device, the power storage device starts being charged when the voltage of the power grid exceeds a threshold. According to Patent Literature 1, an increase in the voltage of the power grid can be prevented by decreasing the power flowing backward to the power grid but without decreasing the output power from the power generator.

CITATION LIST

Patent Literature

Patent Literature 1: International Publication WO 2013/015256

SUMMARY

Technical Problem

There is, however, a problem with the above conventional technique in that, when the power needed for charging the power storage device is greater than the output power from the power generator, power is purchased from the power grid to make up for the shortage of power. Furthermore, when the charging rate of the power storage device is suddenly increased, the power storage device cannot be charged further, and therefore there is an increase in the period of time for which the output power from the power generator is forced to be decreased, with the result that the power generator has lower usage efficiency. Thus, power management is not performed efficiently.

The present invention has been made in view of the above, and an object of the invention is to obtain a power management system that includes a power generator and a power storage device that can both be operated efficiently.

Solution to Problem

In order to solve the problem and achieve the objective described above, the present invention relates a power management system for supplying generated power from a power generator to a power grid and a power storage device. The system includes: a controller to control charging power supplied to the power storage device and output power from the power generator in order for the generated power sent not to flow backward to the power grid; a voltage monitoring unit to monitor a voltage of the power grid; and a current monitoring unit to monitor a current from the power grid. The controller controls the charging power sent to the power storage device in accordance with power purchased from the power grid on the basis of the voltage and the current. The power storage device and the power generator are controlled in accordance with different thresholds of purchased power.

Advantageous Effects of Invention

The power management system according to the present invention includes a power generator and a power storage device that can both be operated efficiently.

DESCRIPTION OF EMBODIMENTS

A power management system according to embodiments of the present invention will now be described in detail with reference to the drawings. Note that the present invention is not limited to the embodiments.

First Embodiment

Figure 1:
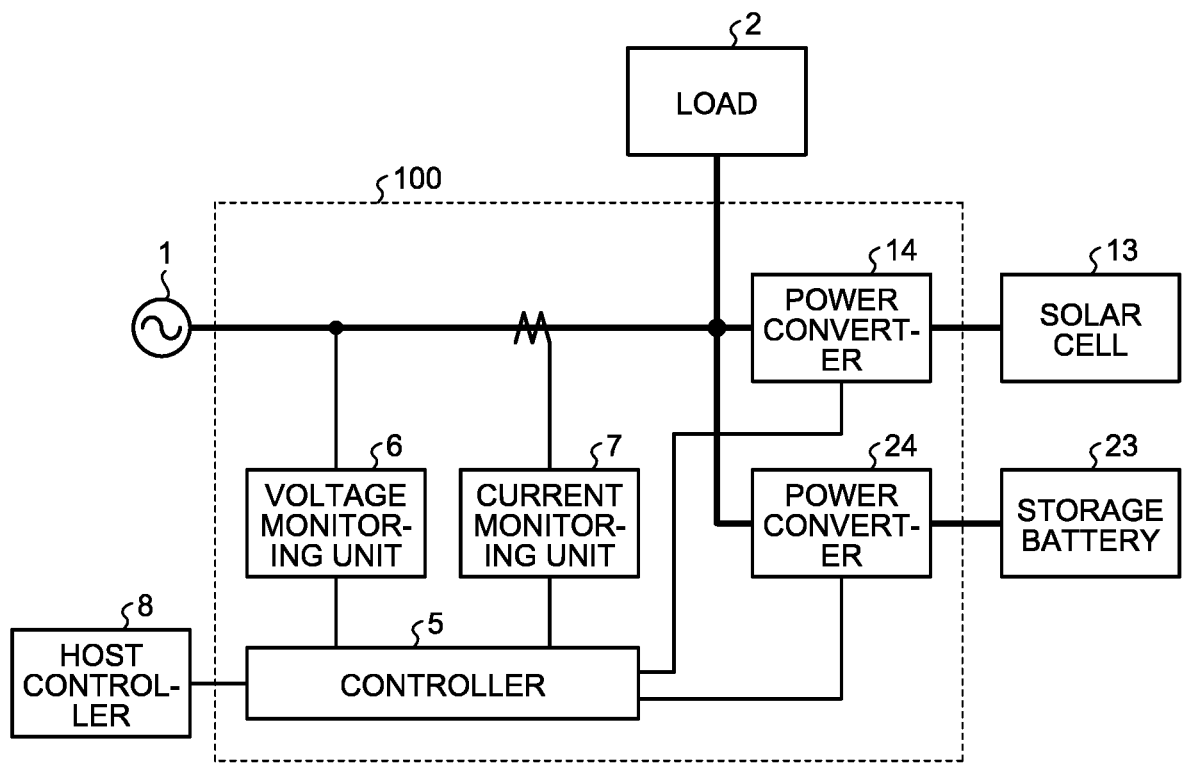
FIG. 1 is a diagram illustrating an example of the configuration of a power management system according to a first embodiment.

FIG. 1 is a diagram illustrating an example of the configuration of a power management system according to a first embodiment. A power management system 100 illustrated in FIG. 1 is connected to a power grid 1; a solar cell 13, which is a power generator; and a storage battery 23, which is a power storage device. The power management system 100 includes a power converter 14 for the solar cell; a power converter 24 for the storage battery; a controller 5; a voltage monitoring unit 6; and a current monitoring unit 7.

The power grid 1 and the power converters 14 and 24 are connected to a load 2 in a house. The controller 5 receives a request to prevent reverse power flow from a host controller 8. The host controller 8 is a controller installed on the power supply side such as a power company.

The voltage monitoring unit 6 monitors the voltage of the power grid 1. The current monitoring unit 7 monitors the current from the power grid 1; and the controller 5 monitors power purchased from the power grid 1 by using the voltage and the current of the power grid 1. The power converter 14 converts DC power from the solar cell 13 into AC power and supplies generated power to the power grid 1 and the load 2. The power converter 24 converts DC power from the storage battery 23 into AC power that is sent as supply power from the storage battery 23 to the load 2; and it converts AC power from the power grid 1 into DC power that is sent as supply charging power to the storage battery 23.

When the host controller 8 makes a request to prevent reverse power flow or when the voltage monitored by the voltage monitoring unit 6 exceeds a threshold voltage, and if the purchased power has reached a threshold of purchased power, the controller 5 controls the power converter 24 such that it increases the charging power sent to the storage battery 23 or the controller 5 controls the power converter 14 such that it decreases the output power from the solar cell 13. Note that while the controller 5 may determine the charging power sent to the storage battery 23 and the output power from the solar cell 13 upon receiving a request to prevent reverse power flow from the host controller 8; the controller 5 may alternatively, upon receiving a target value of the power purchased from the power grid 1, control the power converter 14 and the power converter 24 and thus set the charging power sent to the storage battery 23 and the output power from the solar cell 13. Alternatively, the controller 5 may determine the charging power sent to the storage battery 23 and the output power from the solar cell 13 upon receiving target values of the charging power sent to the storage battery 23 and the output power from the solar cell 13.

Figure 2:
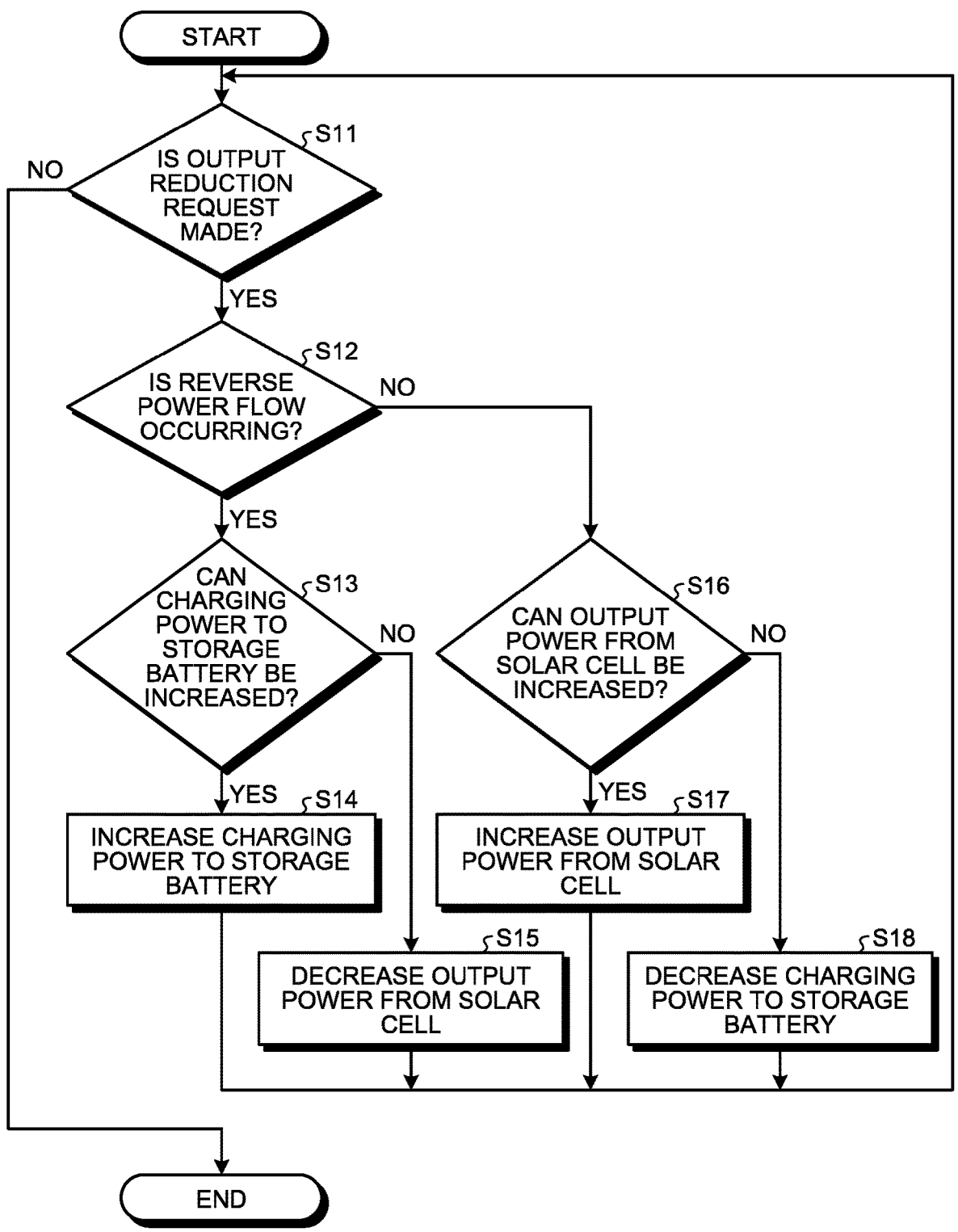
FIG. 2 is a flowchart illustrating an example of the operation of a controller that determines the charging power sent to a storage battery and the output power from a solar cell illustrated in FIG. 1.

FIG. 2 is a flowchart illustrating an example of the operation of the controller 5 that determines the charging power sent to the storage battery 23 and the output power from the solar cell 13 illustrated in FIG. 1. The controller 5 starts the processing first by determining whether or not an output reduction request has been made from the host controller 8 (S11). The controller 5 ends the processing if an output reduction request has not been made (No at S11). If an output reduction request has been made from the host controller 8 (Yes at S11), the controller 5 determines whether or not reverse power flow is occurring (S12). Here, the controller 5 determines that reverse power flow is occurring when the purchased power is decreased to reach the threshold of purchased power. If reverse power flow is occurring (Yes at S12), the controller 5 determines whether or not the charging power sent to the storage battery 23 can be increased (S13). If the charging power sent to the storage battery 23 can be increased (Yes at S13), the controller 5 controls the power converter 24 such that it increases the charging power sent to the storage battery 23 (S14). If the charging power sent to the storage battery 23 has reached the maximum charging power and cannot be increased (No at S13), the controller 5 controls the power converter 14 such that it decreases the output power from the solar cell 13 (S15). Note that the maximum charging power is an upper limit of power to which the storage battery 23 can be charged.

Alternatively, the controller 5 determines that reverse power flow is not occurring when the purchased power is increased to reach the threshold of purchased power. If reverse power flow is not occurring (No at S12), the controller 5 determines whether or not the output power from the solar cell 13 can be increased (S16). If the output power from the solar cell 13 can be increased (Yes at S16), the controller controls the power converter 14 such that it increases the output power from the solar cell 13 (S17). The controller controls the power converter 24 such that it decreases the charging power sent to the storage battery 23 (S18) if the output power from the solar cell 13 cannot be increased because its output power has reached the maximum output power or the amount of solar radiation has decreased (No at S16). Note that the controller 5 ends the processing and resumes regular operation once there is no request to prevent reverse power flow being made by the host controller 8.

Figure 3:
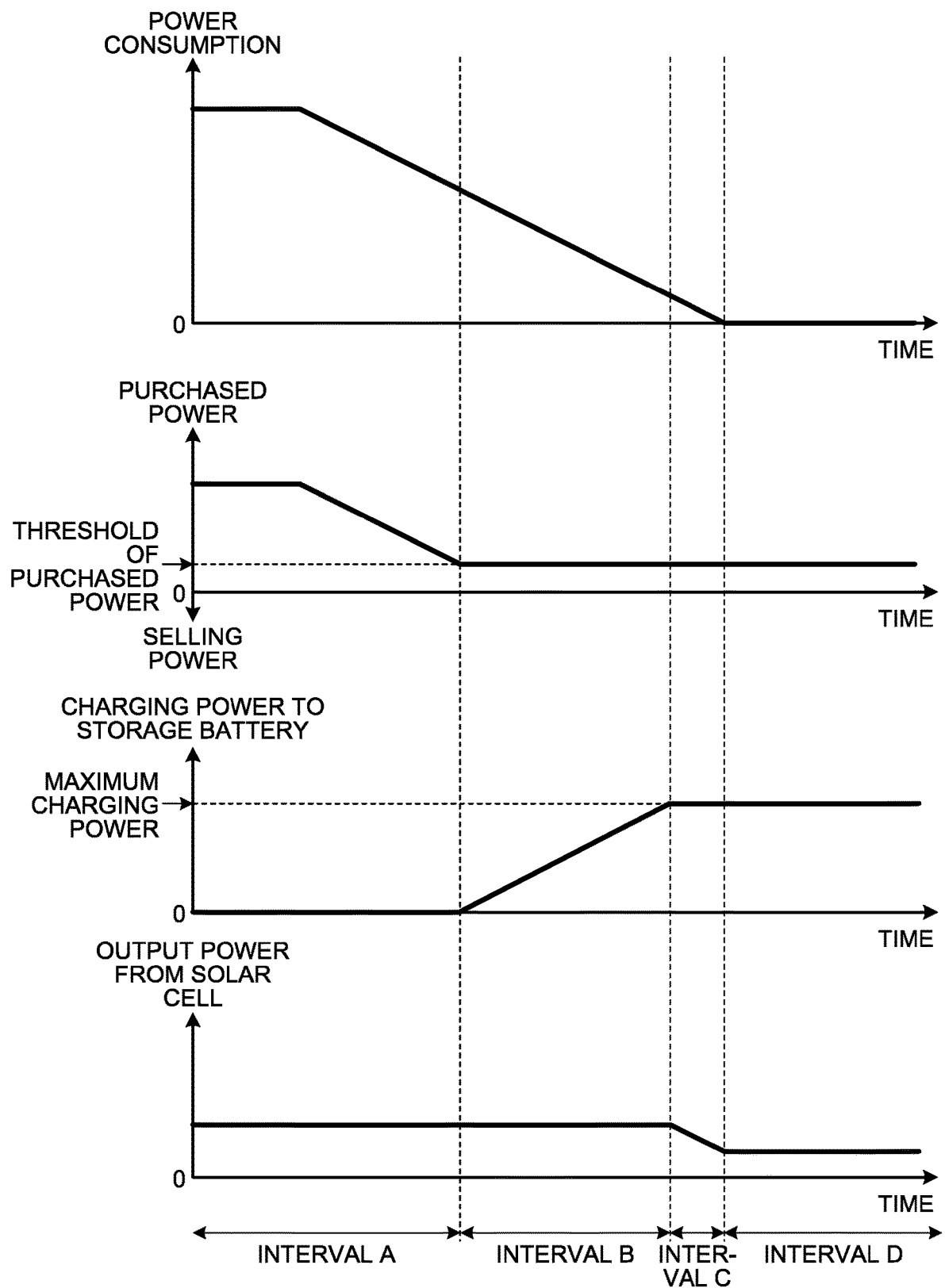
FIG. 3 is a diagram illustrating a timing diagram of power consumption of a load, power purchased from a power grid, the charging power sent to the storage battery, and the output power from the solar cell according to the first embodiment.

FIG. 3 is a diagram illustrating a timing diagram of the power consumption of the load 2, the power purchased from the power grid 1, the charging power sent to the storage battery 23, and the output power from the solar cell 13 according to the first embodiment. In interval A of FIG. 3, the controller 5 decreases the purchased power as the power consumption is decreased. The controller determines that reverse power flow is occurring when the purchased power reaches the threshold of purchased power, thereby increasing the charging power sent to the storage battery 23 in interval B. When the charging power sent to the storage battery 23 reaches the maximum charging power in interval B, the controller 5 decreases the output power from the solar cell 13 in interval C. Note that the power is referred to as purchased power when the current flows from the power grid to the load and to the power converter; and it is referred to as selling power when the current flows from the load and from the power converter to the power grid, with the presence of selling power indicating the occurrence of reverse power flow.

Second Embodiment

Figure 4:
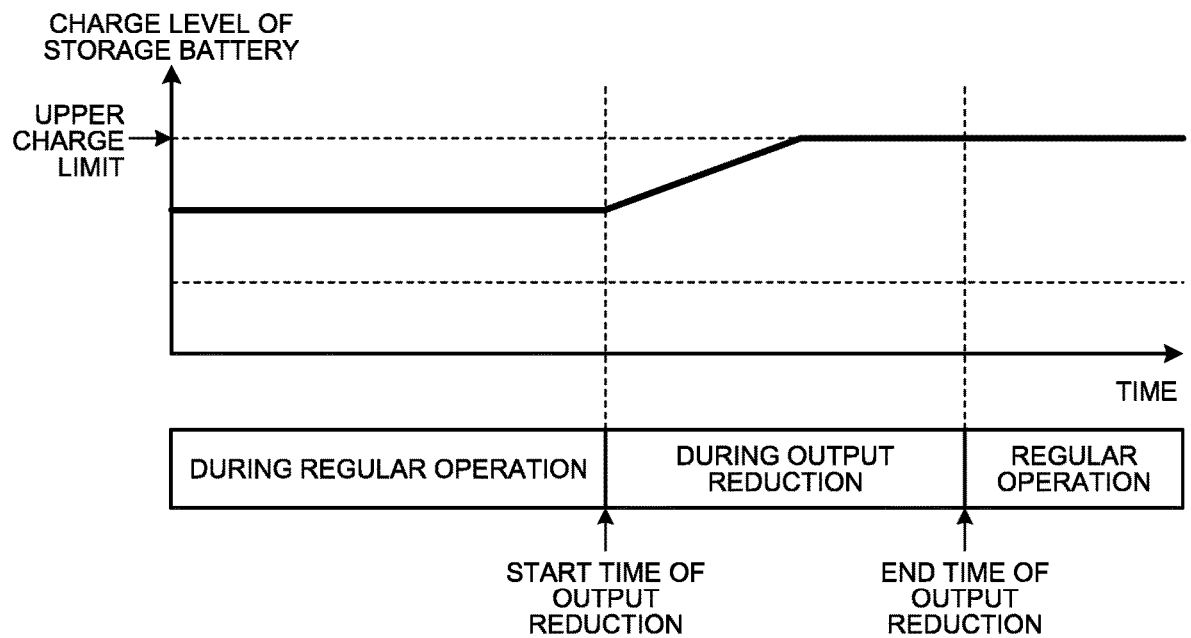
FIG. 4 is a diagram illustrating a timing diagram for determining the charging power sent to the storage battery according to a second embodiment.

FIG. 4 is a diagram illustrating a timing diagram for determining the charging power sent to the storage battery 23 according to a second embodiment. The controller 5 may receive schedule information for preventing reverse power flow from the host controller 8, with a start time set in this schedule information at which charging the storage battery 23 by using the control means of the first embodiment is started and with an end time also set in the schedule information at which regular operation is resumed. Note that the storage battery 23 cannot be charged when the charge level of the storage battery 23 reaches an upper charge limit during the time period for preventing reverse power flow; and when this happens, the controller 5 controls the power converter 14 such the output power from the solar cell 13 is decreased.

Third Embodiment

Figure 5:
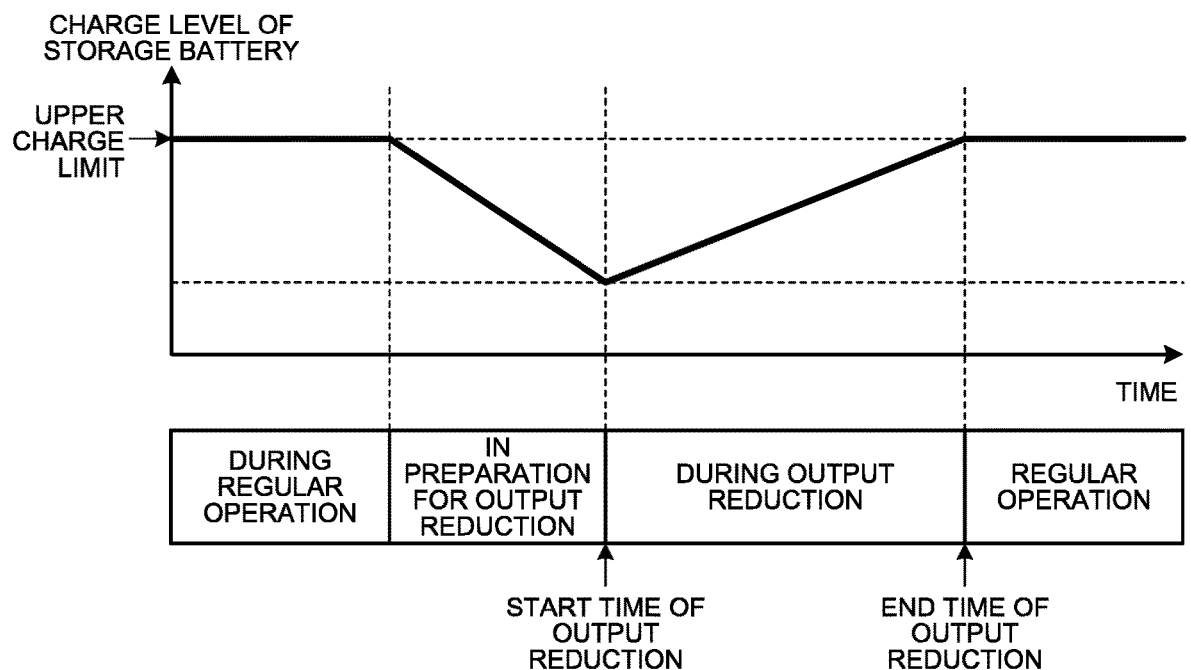
FIG. 5 is a diagram illustrating a timing diagram for determining the charging power sent to the storage battery and discharging power from the storage battery according to a third embodiment.

FIG. 5 is a diagram illustrating a timing diagram for determining the charging power sent to the storage battery 23 and discharging power from the storage battery 23 according to a third embodiment. The second embodiment has a problem in that the output power from the solar cell 13 is decreased because the storage battery 23 cannot be charged when the charge level of the storage battery 23 reaches the upper charge limit during the time period for preventing reverse power flow. In view of the above, the third embodiment lowers the charge level by discharging power from the storage battery 23 to the load 2 before the start time set in the schedule information, thereby extending the time for which the storage battery 23 can be charged and cutting the time for which the output power from the solar cell 13 is decreased. Note that even during the time period for preventing reverse power flow, power may be discharged from the storage battery 23 to lower the charge level thereof when the power consumption of the load 2 is greater than the output power from the solar cell 13.

Fourth Embodiment

Figure 6:
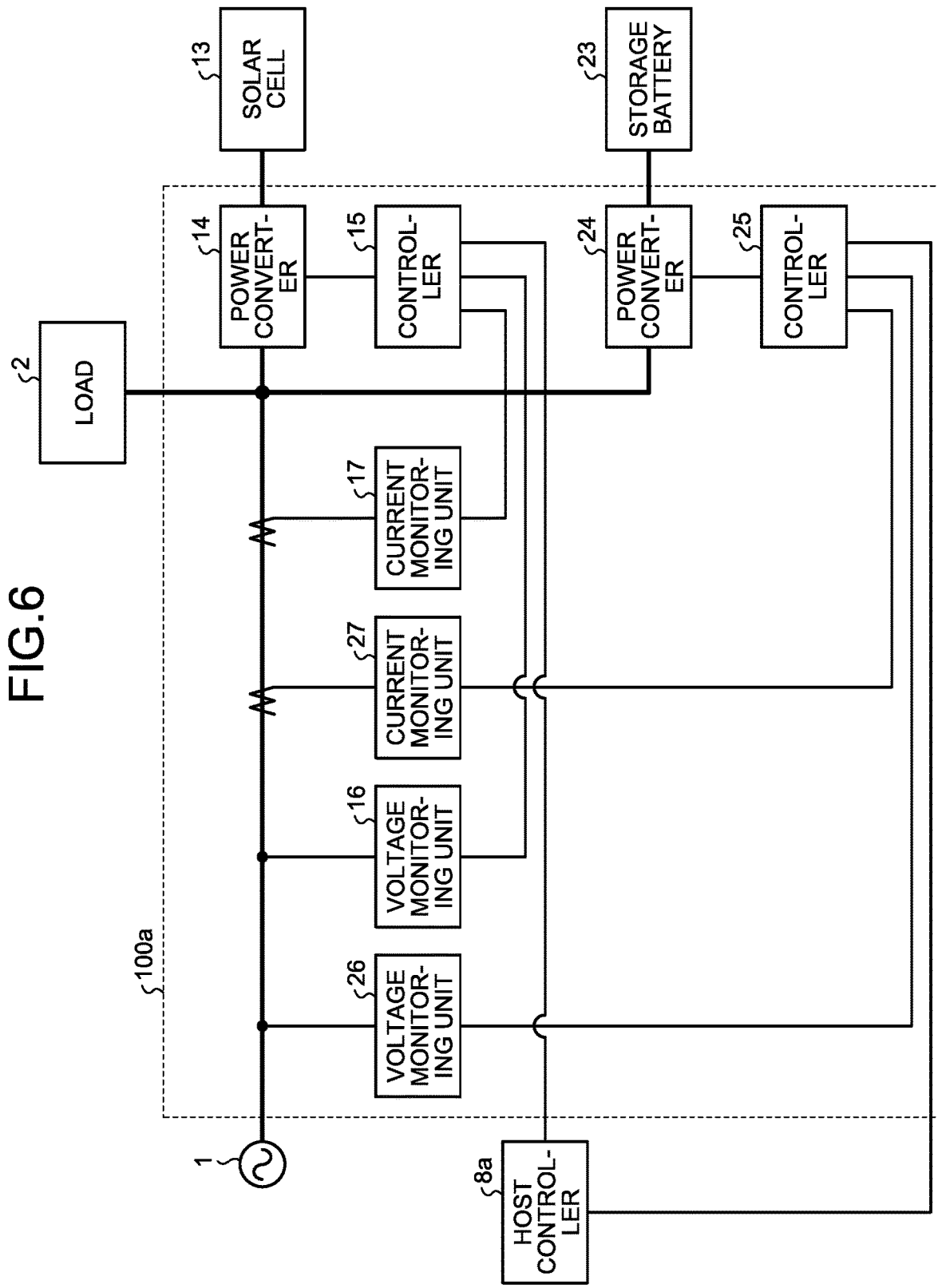
FIG. 6 is a diagram illustrating an example of the configuration of a power management system according to a fourth embodiment.

FIG. 6 is a diagram illustrating an example of the configuration of a power management system according to a fourth embodiment. Instead of the controller 5, the voltage monitoring unit 6, and the current monitoring unit 7 illustrated in FIG. 1, there is a power management system 100a, as illustrated in FIG. 6, that includes a controller 15 for the solar cell; a voltage monitoring unit 16 for the solar cell; a current monitoring unit 17 for the solar cell; a controller 25 for the storage battery; a voltage monitoring unit 26 for the storage battery; and a current monitoring unit 27 for the storage battery.

As in FIG. 1, the load 2 is connected to the power converter 14 for solar power generation, the power converter 24 for the storage battery, and the power grid 1. Moreover, the controllers 15 and 25 may be configured to each receive a request to prevent reverse power flow from a host controller 8a, or they may be configured to each receive a request from a host controller (not illustrated) in the power management system 100a that receives a request to prevent reverse power flow from the host controller 8a. The fourth embodiment can be used when the solar cell 13 and the storage battery 23 are installed individually.

The voltage monitoring unit 16 and the voltage monitoring unit 26 monitor the voltage of the power grid 1, and the current monitoring unit 17 and the current monitoring unit 27 monitor the current from the power grid 1. Note that the voltage monitoring unit 16 and the voltage monitoring unit 26 may be a common configuration, and the current monitoring unit 17 and the current monitoring unit 27 may be a common configuration, in which case one voltage monitoring unit and one current monitoring unit may be connected to each of the controllers 15 and 25.

When the host controller 8a makes a request to prevent reverse power flow or when the voltage monitored by the voltage monitoring unit 16 exceeds a threshold voltage, then, if the purchased power has reached the threshold of purchased power, the controller 15 decreases the output power from the solar cell 13. When the host controller 8a makes a request to prevent reverse power flow or when the voltage monitored by the voltage monitoring unit 26 exceeds a threshold voltage, then, if the purchased power has reached the threshold of purchased power, the controller 25 increases the charging power sent to the storage battery 23.

Note that the controller 15 may determine the output power from the solar cell 13 upon receiving a request to prevent reverse power flow from the host controller 8a. Alternatively, the controller 15 may determine the output power from the solar cell 13 upon receiving a target value of the power purchased from the power grid 1. Alternatively, the controller 15 may determine the output power from the solar cell 13 upon receiving a target value of the output power from the solar cell 13. Moreover, the controller 25 may determine the charging power sent to the storage battery 23 upon receiving a request to prevent reverse power flow from the host controller 8a. Alternatively, the controller 25 may determine the charging power sent to the storage battery 23 upon receiving a target value of the purchased power from the power grid 1. Alternatively, the controller 25 may determine the charging power sent to the storage battery 23 upon receiving a target value of the charging power sent to the storage battery 23.

Fifth Embodiment

Figure 7:
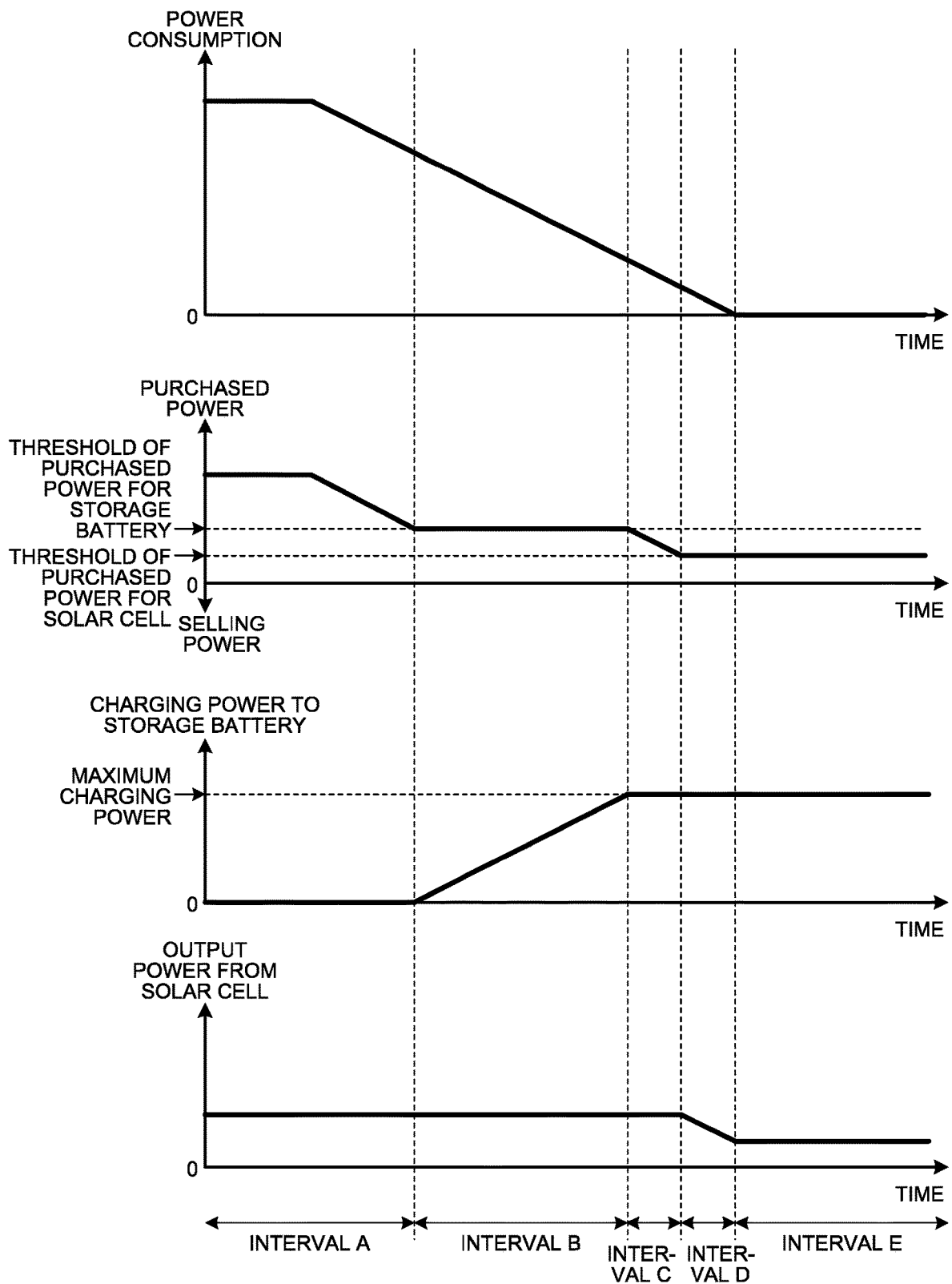
FIG. 7 is a diagram illustrating a timing diagram of the power consumption of the load, the power purchased from the power grid, the charging power sent to the storage battery, and the output power from the solar cell according to a fifth embodiment.

FIG. 7 is a diagram illustrating a timing diagram of the power consumption of the load 2, the power purchased from the power grid 1, the charging power sent to the storage battery 23, and the output power from the solar cell 13 according to a fifth embodiment. For the fourth embodiment, it is assumed that the solar cell and the storage battery are installed individually, and there is a problem in that the controller 15 and the controller 25 need to be monitored and controlled by the host controller 8a or need to exchange information with each other and control each other in order to have coordination between the controllers. In view of the above, in the fifth embodiment, the threshold of purchased power for the controller 25 is set higher than the threshold of purchased power for the controller 15, thereby giving priority to increasing the charging power sent to the storage battery 23 over decreasing the output power from the solar cell 13. That is, the power converter 14 and the power converter 24 are controlled in accordance with different thresholds of purchased power. In interval A of FIG. 7, the controller 25 decreases the purchased power as the power consumption is decreased. The controller 25 determines that reverse power flow is occurring when the purchased power is decreased to reach the threshold of purchased power, thereby increasing the charging power sent to the storage battery 23 in interval B. Moreover, because the charging power sent to the storage battery 23 reaches the maximum charging power in interval B and the power consumption is decreased in interval C, the controller 15 determines that reverse power flow is occurring if the purchased power is decreased to reach the threshold of purchased power, thereby decreasing the output power from the solar cell 13 in interval D.

The power management system described in the first to fifth embodiments includes the power generator and the power storage device, and it is suitable for a power management system that prevents reverse power flow.

Note that the power generator of the present invention is not limited to being a solar cell but may be a fuel cell or a wind turbine generator. Moreover, the power storage device of the present invention is not limited to being a stationary storage battery but may be a storage battery mounted on an electric vehicle.

With conventional techniques, purchased power is purchased from the power grid to make up for a shortage of power when the charging power sent to the power storage device is greater than the output power from the power generator. Thus, in the case where the power generator is a solar cell, costly daytime electricity is purchased and this is inefficient in terms of cost. Moreover, the power storage device cannot be charged further when the charge level thereof suddenly increases, and therefore there is an increase in the period of time for which the output power from the power generator is forced to be decreased, with the result that the power generator has lower usage efficiency.

When the voltage of the power grid exceeds the threshold voltage or when the power company makes a request to prevent reverse power flow to the power grid, the power management system described in the first to fifth embodiments reduces the power purchased from the power grid as much as possible by sending charging power to the power storage device while adjusting the charging power thereto, thereby cutting the time for which the output power from the power generator is decreased and being able to prevent a reduction in the usage efficiency of the power generator as much as possible.

The configurations illustrated in the aforementioned embodiments merely illustrate examples of the content of the preset invention and can thus be combined with another known technique or partially omitted and/or modified without departing from the scope of the present invention.

REFERENCE SIGNS LIST 1 power grid; 2 load; 5, 15, 25 controller; 6, 16, 26 voltage monitoring unit; 7, 17, 27 current monitoring unit; 8, 8a host controller; 13 solar cell; 14, power converter; 23 storage battery; 100, 100a power management system.

The invention claimed is:

1. A power management system for supplying generated power from a power generator to a power grid and a power storage device, the system comprising:
   a controller to control charging power supplied to the power storage device and output power from the power generator in order for the generated power sent not to flow backward to the power grid;
   a voltage monitoring unit to monitor a voltage of the power grid; and
   a current monitoring unit to monitor a current of the power grid, wherein
   the controller controls the charging power sent to the power storage device in accordance with power purchased from the power grid on the basis of the voltage and the current, and
   the power storage device and the power generator are controlled in accordance with different thresholds of purchased power.

2. The power management system according to claim 1, wherein,
   when receiving schedule information from an external source, the controller prevents reverse power flow to the power grid in accordance with the schedule information.

3. The power management system according to claim 2, wherein
   the controller controls the charging power sent to the power storage device on the basis of the schedule information.

4. A power management system for supplying generated power from a power generator to a power grid and a power storage device, the system comprising:
   a controller to perform control that
      increases charging power supplied to the power storage device, when a request signal for preventing a reverse power flow to the power grid is received and the reverse power flow is actually occurring, and
      when the request signal is received but the reverse power flow is not actually occurring, perform control that
         increases output power from the power generator in a case where the output power from the power generator can be increased, and
         decreases the charging power supplied to the power storage device in a case where the output power from the power generator cannot be increased.

5. The power management system according to claim 4, wherein,
   when purchased power based on a voltage and a current of the power grid is lower than a preset threshold of purchased power, the controller determines that the reverse power flow is occurring and performs control to increase the charging power supplied to the power storage device.

6. The power management system according to claim 4, wherein
   the controller performs control to reduce the output power from the power generator, when the charging power to the power storage device cannot be increased.

7. The power management system according to claim 5, wherein
   the controller performs control to reduce the output power from the power generator, when the charging power to the power storage device cannot be increased.

8. A power management system for supplying generated power from a power generator to a power grid and a power storage device, the system comprising:
   a controller to perform control that increases charging power supplied to the power storage device, when receiving a request signal for preventing a reverse power flow to the power grid and when the reverse power flow is actually occurring, wherein
   the controller
      performs control to increase the charging power supplied to the power storage device determining that the reverse power flow is occurring, when purchased power based on a voltage and a current of the power grid is lower than a threshold of purchased power being a preset threshold for the power storage device, and
      performs control to decrease output power from the power generator, when the purchased power is lower than a threshold of purchased power for the power generator that is set as a threshold for the power generator lower than the threshold of purchased power.

9. A power management system for supplying generated power from a power generator to a power grid and a power storage device, the system comprising:
   a controller to perform control that increases charging power supplied to the power storage device determining that a reverse power flow to the power grid is occurring, when purchased power based on a voltage and a current of the power grid is lower than a threshold of purchased power being a preset threshold for the power storage device, wherein
   the controller performs control to decrease output power from the power generator, when the purchased power is lower than a threshold of purchased power for the power generator that is set as a threshold for the power generator lower than the threshold of purchased power.

* * * * *